US012808771B2

(12) United States Patent
Diao et al.

(10) Patent No.: US 12,808,771 B2
(45) Date of Patent: Nov. 24, 2026

(54) AUTO GATING OF QC BASED ON POPULATION ANALYSIS

(71) Applicant: Beckman Coulter Biotechnology (Suzhou) Co., Ltd., Suzhou (CN)

(72) Inventors: Jianxiang Diao, Dalian (CN); Xiaonan Cai, Dalian (CN)

(73) Assignee: Beckman Coulter Biotechnology (Suzhou) Co., Ltd., Suzhou (CN)

( * ) Notice: Subject to any disclaimer, the term of this patent is extended or adjusted under 35 U.S.C. 154(b) by 372 days.

(21) Appl. No.: 18/485,148

(22) Filed: Oct. 11, 2023

(65) Prior Publication Data

US 2024/0118186 A1 Apr. 11, 2024

(30) Foreign Application Priority Data

Oct. 11, 2022 (CN) ......................... 202211242252.6

(51) Int. Cl.
*G01N 15/1429* (2024.01)
*G01N 21/64* (2006.01)
*G01N 15/14* (2006.01)

(52) U.S. Cl.
CPC ......... *G01N 15/1429* (2013.01); *G01N 21/64* (2013.01); *G01N 2015/1402* (2013.01)

(58) Field of Classification Search
CPC .... G01N 15/1429; G01N 15/14; G01N 15/10; G01N 15/00; G01N 21/64; G01N 21/63; G01N 21/62; G01N 21/00; G01N 2015/1402; G01N 2015/1014; G01N 15/1012; G01N 15/1459; G01N 15/1456
See application file for complete search history.

(56) References Cited

U.S. PATENT DOCUMENTS

2003/0142289 A1* 7/2003 Ortyn ................ G01N 15/1012 356/28
2013/0123131 A1* 5/2013 Purvis .................... C12Q 1/025 506/10
2014/0193892 A1* 7/2014 Mohan .............. G01N 15/1433 435/287.2
2015/0140577 A1* 5/2015 Li .................... G01N 33/56972 250/226
2015/0198584 A1* 7/2015 Rajwa ............... G01N 33/5008 702/19

* cited by examiner

*Primary Examiner* — Mohamed Charioui
(74) *Attorney, Agent, or Firm* — Merchant & Gould P.C.

(57) ABSTRACT

The present application relates to a system or method for auto gating of QC base on population analysis. The system or method is particular useful for a sample processing instrument (for example, a flow cytometer or analyzer). The method comprise the following steps: I) providing QC beads used for testing the performance index of an equipment of interest; II) setting the equipment to collect the data of the QC beads; III) analyzing the collected data and calculating the gate position of QC beads based on the collected data; and VI) adjusting the acquisition parameters of the equipment based on the calculated gate position.

19 Claims, 3 Drawing Sheets

FIG. 3

| Comparison | Mechanism | Required sample purity | Required Signal noise rate | Required sample residual in lines | QC pass rate |
|---|---|---|---|---|---|
| Prior art method | Analysis based on highest peak | >50% | <50% | - | Low |
| New method | Analysis based on QC bead characteristics | >5% for single-peak beads; >40% for 8-peak beads | <95% for single-peak beads; <60% for 8-peak beads | <5% for single-type samples | High |

AUTO GATING OF QC BASED ON POPULATION ANALYSIS

CROSS REFERENCE TO RELATED APPLICATION

This application claims benefit of priority to Application No. 202211242252.6, filed Oct. 11, 2022 in China, and which application is hereby incorporated by reference in its entirety.

FIELD

The present application relates to a system or method for auto gating of QC base on population analysis. The system or method is particular useful for a sample processing instrument (for example, a flow cytometer or analyzer).

BACKGROUND

This section only provides background information related to the present disclosure, which is not necessarily the prior art.

A sample processing instrument is usually used to analyze a liquid sample including suspended particles (e.g., biological particles, non-biological particles) or cells and/or to sort the particles or cells therein. QC experiment is generally used to test the index of performance of the instrument, which comprises the process of collecting QC beads, setting the gate and marking the QC beads, etc. Wherein, the acquisition parameter can be adjusted, so as to ensure that the data collected from the QC beads is distributed within the effective range. However, in some occasions, QC experiments will fail because of the impacts from QC impurity or noise, leading to an error position of the auto gating. In order to improve the passing rate of QC experiment, a new method is needed for the QC experiments and for correct calculation of the gate position of the QC beads.

In the prior arts, the one-dimensional data analysis can be used to draw a histogram of the FSC distribution of QC beads, to analyze the highest peak of the one-dimensional histogram, and to identify the highest peak for the QC bead group. However, some conditions are necessary for such QC method, including high purity of QC beads sample, concentrated, but not scattered, QC beads distribution, and a clean device without any other sample residual. If these conditions are not met, the QC experiments can easily fail. In such occasions, the user has to re-adjust the equipment parameter; to clean it for many times; and to perform the QC experiment again. This will negatively affect the user's experience. Therefore, it is desired to develop a new process to provide a more robust system or method for auto gating of QC base on population analysis.

SUMMARY

This section provides a general summary of the disclosure and is not a comprehensive disclosure of its full scope or all of its features.

An object of the present application is to provide a method of auto gating of quality control (QC) based on population analysis. The method comprises the following steps:

I) providing QC beads used for testing the performance index of an equipment of interest;

II) setting the equipment to collect the data of the QC beads;

III) analyzing the collected data and calculating the gate position of QC beads based on the collected data; and VI) adjusting the acquisition parameters of the equipment based on the calculated gate position.

In some examples according to the present disclosure, the QC beads are the same size.

In some examples according to the present disclosure, the size of the QC beads is in the range of 40 nm to 10 μm.

In some examples according to the present disclosure, the size of the QC beads is 500 nm, 3 μm, 6 μm or 10 μm.

In some examples according to the present disclosure, the QC beads are beads conjugated with a fluorescence agent. In some examples according to the present disclosure, the fluorescence agent is configured to generate fluorescence data in one or more fluorescence channels.

In some examples according to the present disclosure, step II) further includes collecting forward scatter (FSC) data of the QC beads, and wherein the FSC data is determined by the size of the QC beads.

In some examples according to the present disclosure, step II) further includes collecting side scatter (SSC) data of the QC beads, and wherein the SSC data is determined by the surface smoothness of the QC beads.

In some examples according to the present disclosure, the step II) further includes collecting fluorescence intensity data of the QC beads in each channel. In some examples according to the present disclosure, the fluorescence intensity of the QC beads in each channel is in a concentrated range, and the Log axis coordinate system is adopted, so that the fluorescence channel data is distributed in the Log axis coordinate system in a concentrated area. In some examples according to the present disclosure, the QC beads include eight-peak beads which are distributed in one peak for the FSC and SSC, and distributed in eight peaks in fluorescence channels, and the beads of the eighth peak is distributed on the eighth peak or on the peak with the greatest fluorescence value in all fluorescence channels.

In some examples according to the present disclosure, step III) includes performing QC beads population analysis through the following steps:

1) set total QC-bead filter result to all cells;

2) circulate the highest peak analysis for each of one or more fluorescence channels;

3) analyze the peak for FSC or SSC signal based on filter results of the highest peak analysis for the QC beads; and 4) analyze the peak for specific fluorescence channel data based on filter results of auto gating on FSC or SSC.

In some examples according to the present disclosure, step 2) further includes:

a) obtaining fluorescence channel data range;

b) creating fluorescence channel coordinate transformation based on the fluorescence channel data range;

c) performing coordinate transformation on the fluorescence channel data to obtain model data;

d) creating fluorescence histogram plot based on the obtained statistics model data;

e) performing multi-peak data analysis on the fluorescence histogram to obtain the highest peak data range analysis;

f) filtering the model data based on the highest peak data range to obtain the highest peak of the fluorescence channel including the QC beads filtering result; and g) performing logical operation on the overall QC beads filter result and the filter result of the fluorescence channel, and set it to the overall QC beads filter result.

In some examples according to the present disclosure, for the multi-peak data analysis of e), peak information is searched from high to low, wherein if the total number of beads in the searched peak accounts for <5%, the data segment is discarded as an interference signal, and the searching for peak information is continued in the low value space.

In some examples according to the present disclosure, after multiple filtering and merging operations of the fluorescence channels, the overall QC beads filter results represent the QC beads population with the highest peak of all calculated fluorescence channels.

In some examples according to the present disclosure, step 3) further includes:

a) obtaining FSC or SSC channel data range;
b) creating channel coordinate transformation based on the channel data range;
c) performing coordinate transformation on the channel data to obtain model data;
d) creating histogram plot based on the filtering result of the highest fluorescence peak and the statistics model data of FSC or SSC;
e) analyzing the peaks based on the histogram plot and obtain the max peak data range;
f) obtaining the FSC or SSC edge of the max peak and convert it to world coordinate value, as auto gate position; and
g) using the max peak range to perform filtering calculations on all FSC or SSC data to obtain the FSC or SSC plot filtering results.

In some examples according to the present disclosure, step 4) further includes:

a) obtaining fluorescence channel data range;
b) creating channel coordinate transformation based on the channel data range;
c) performing channel coordinate transformation on the channel data to obtain model data;
d) Creating fluorescence histogram plot based on the statistical model data of the FSC or SSC filtering results;
e) analyzing the peaks based on the histogram plot;
f) obtaining the edge range of each peak; and
g) converting the edge range of each peak to world coordinate position, as the multi-peak automatic plot position of the QC fluorescence channel.

According to another aspect of the present disclosure, the QC beads comprise beads with the same size and different fluorescence intensity. According to another aspect of the present disclosure, the beads with the same size and different fluorescence intensity are eight-peak beads.

According to still another aspect of the present disclosure, when the filtering bead range is supplemented after obtaining the FSC position of the QC beads, the data of the filtered beads are used to draw the bead distribution in the fluorescence channel, and multiple peaks are identified by multi-peak identification method.

In some examples according to the present disclosure, the equipment of interest is a flow cytometer.

The above and other objects, features and advantages of the present disclosure will be more fully understood from the detailed description given below and the accompanying drawings, which are given by way of illustration only and therefore are not considered to limit the present disclosure.

BRIEF DESCRIPTION OF THE DRAWINGS

The features and advantages of one or more embodiments of the present disclosure will become more readily understood from the following description with reference to the accompanying drawings in which:

FIG. 3 is a comparison between the prior art process and the analysis process of the present disclosure.

DETAILED DESCRIPTION OF THE EMBODIMENTS

Figure 1:
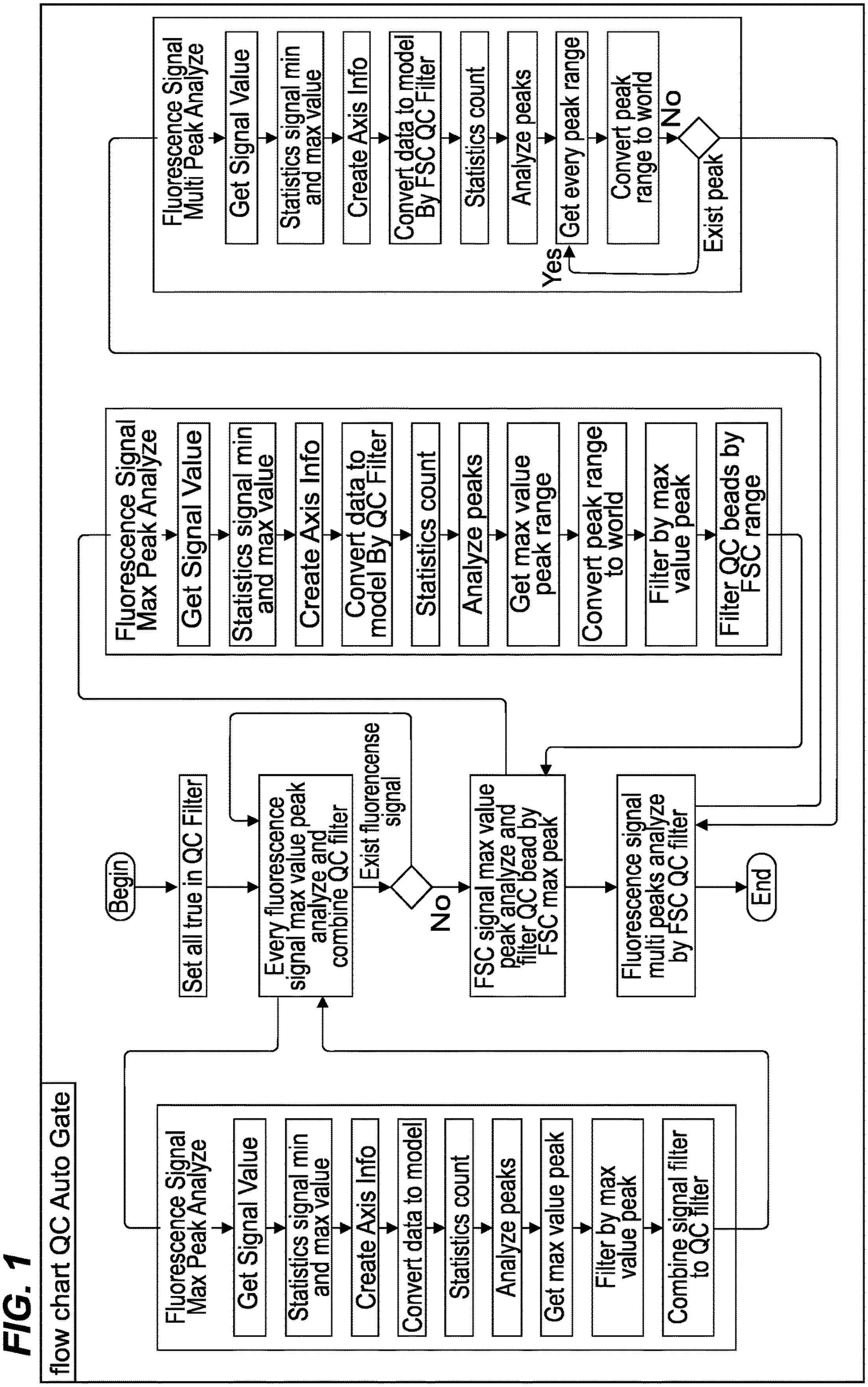
FIG. 1 is a flow chart of QC beads population analysis process of the present disclosure.
Figure 2:
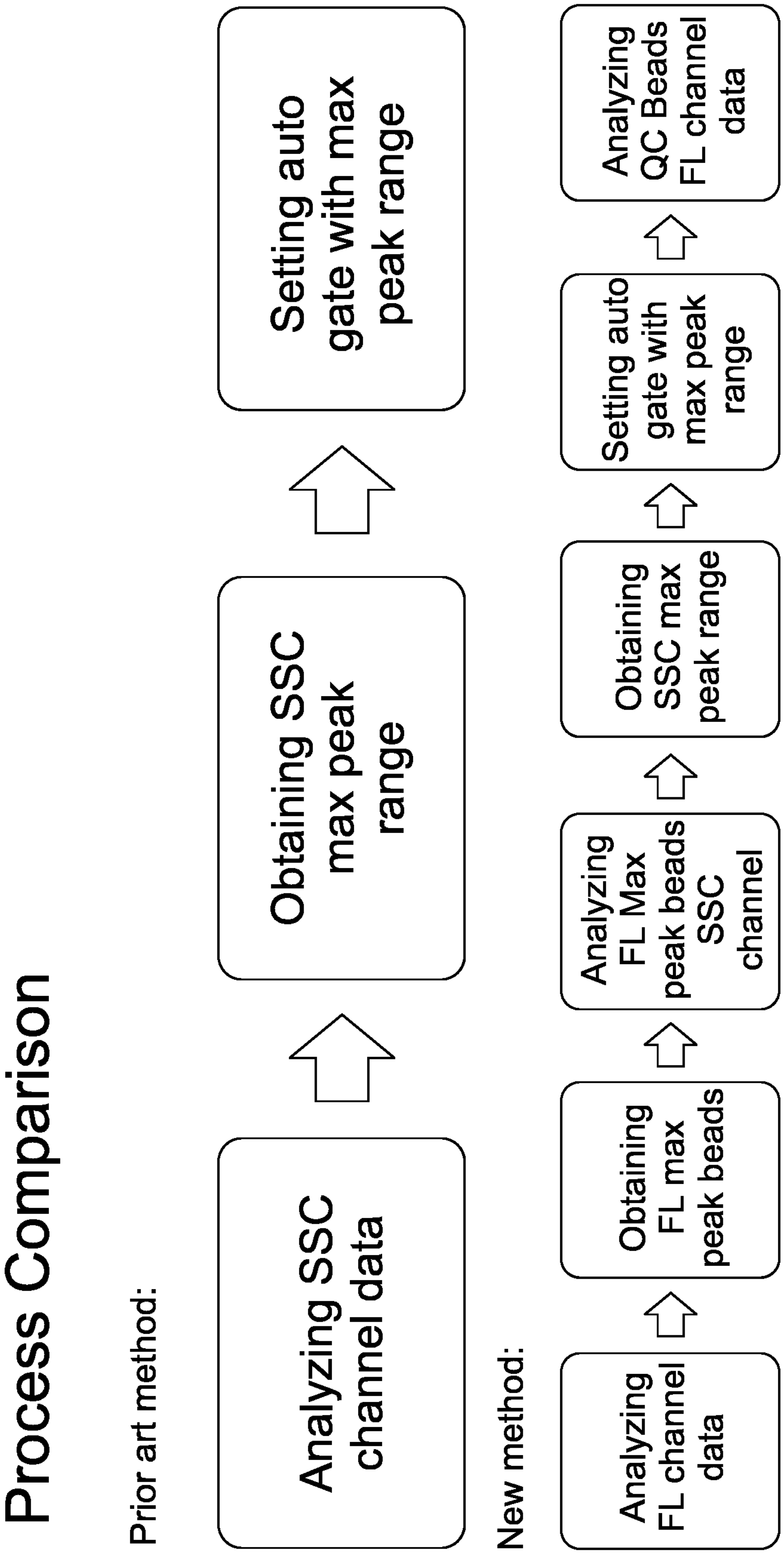
FIG. 2 is a simplified chart of the prior art process and the analysis process of the present disclosure.

Hereinafter, the present disclosure is described in detail through exemplary embodiments with reference to the accompanying drawings. In several drawings, similar reference numerals refer to similar parts and components. The following detailed description of the present disclosure is for purposes of illustration only and is in no way limiting of the present disclosure, its application or uses. The implementations described in this specification are not exhaustive and are merely some of many possible implementations. Exemplary embodiments may be embodied in many different forms and should not be construed as limiting the scope of the present disclosure. In some example embodiments, well-known processes, well-known device structures, and well-known technologies may not be described in detail.

Before describing in detail at least one embodiment of the present application, it is to be understood that the present application is not necessarily limited in its application to the details of construction and the arrangement of components set forth in the following description or illustrated in the accompanying drawings. The present application is applicable to other embodiments and combinations of the disclosed embodiments that may be practiced or carried out in various ways. In addition, it is to be understood that the phraseology and terminology employed herein is for the purpose of description and should not be regarded as limiting.

Unless otherwise expressly indicated from the following discussion, it should be understood that throughout the specification, discussion using terms such as "control", "process", "calculation", "determination/judgment" and "obtaining" refers to the actions and/or processes of a computer or computing system or similar electronic computing device, the above actions and/or processes manipulate and convert data represented as physical quantities such as electrons in the registers or memories of the computing system into other data similarly represented as physical quantities in the memories, registers or other such information storage, transmission or display devices of the computing system.

The method for auto gating of QC base on population analysis will be described below with reference to FIG. 1. FIG. 1 is a flow chart of QC beads population analysis process of the present disclosure. As shown in FIG. 1, at the beginning of the process, the total QC beads filter is set as true to all cells/beads. Then, the following steps are circulated so as to perform the strongest peak analysis for each fluorescence channel:

a) obtaining fluorescence channel data range;
b) creating fluorescence channel coordinate transformation based on channel data range;
c) performing coordinate transformation on fluorescence channel data to obtain model data;
d) building fluorescence histogram based on the statistics model data;

e) performing multi-peak data analysis on the histogram to obtain the highest peak data range analysis, wherein for multiple peaks analysis, peak value is searched from high to low, and wherein if the total number of cells in the searched peak accounts for <5%, the data segment is discarded as an interference signal, and the searching for peak information is continued in the low value space;

f) filtering the model data based on the highest peak data range to obtain the highest peak of the fluorescence channel including the QC beads filter result; and g) performing logical operation on the overall QC beads filter result and the filter result of the fluorescence channel, and set it to the overall QC beads filter result.

After multiple filtering and merging operations of the fluorescence channels, the overall QC beads filter results represent the QC beads population with the highest peak of all calculated fluorescence channels.

In the next step, the peak for FSC or SSC signal is analyzed based on the filter results of the highest peak analysis for the QC beads, comprising:

a) obtaining FSC or SSC channel data range;

b) creating channel coordinate transformation based on the channel data range;

c) performing coordinate transformation on the channel data to obtain model data;

d) creating histogram plot based on the filtering result of the highest fluorescence peak and the statistics model data of FSC or SSC;

e) analyzing the peaks based on the histogram plot and obtain the max peak data range;

f) obtaining the FSC or SSC edge of the max peak and convert it to world coordinate value, as auto gate position; and g) using the max peak range to perform filtering calculations on all FSC or SSC data to obtain the FSC or SSC plot filtering results.

In the next step, analyze the peak for specific fluorescence channel data based on filter results of auto gating on FSC or SSC, comprising:

a) obtaining fluorescence channel data range;

b) creating channel coordinate transformation based on the channel data range;

c) performing channel coordinate transformation on the channel data to obtain model data;

d) Creating fluorescence histogram plot based on the statistical model data of the FSC or SSC filtering results;

e) analyzing the peaks based on the histogram plot;

f) obtaining the edge range of each peak; and g) converting the edge range of each peak to world coordinate position, as the multi-peak automatic plot position of the QC fluorescence channel.

When the filtering bead range is supplemented after obtaining the FSC position of the QC beads, the data of the filtered beads are used to draw the bead distribution in the fluorescence channel, and multiple peaks are identified by multi-peak identification method. The multi-peak identification method comprises:

providing histogram data based on model data synthesis;

analyzing the histogram data from high value to low value, wherein:

if current data is 0, mark the current data as the bottom;

if previous data>current data, mark the current data as rising;

if previous data<current data, mark the current data as falling;

if previous data=current data and not 0, mark the current data as platform; and then recording the data from the bottom to the rising point as the point on the right side of the peak;

recording the data from the rising point to the falling point as the point of the peak; recording the data from the falling point to the bottom as the point on the left side of the peak;

recording the data from the falling point to the rising point as the point on the left side of the peak, add a next peak and record the data as the point on the right side of the next peak;

regarding the data from the rising point to the platform and then to the falling point, recording the peak centered on the platform; and regarding the data from the falling point to the platform and then to the rising point, recording the data of the point on the left side of the current peak as falling to the platform, add a next peak, and record the data of the point on the right side of the next peak as rising to the platform.

In the multi-peak identification method, a half peak width analysis is performed for each time of adding a peak, wherein half peak width threshold=highest peak value*half peak width ratio, and wherein the first point on the left and right sides less than this half peak width threshold is used as the identified half peak width point, and the half peak width boundary is used to set the plot boundary for the outside range.

The multi-peak identification method is particularly beneficial since it can address the problem of data stretching in low value space that affects the data boundary. It is also helpful for recognizing the dependence and statistics of the data, particularly when the data amount is small, the scope of the recognition will be affected. It is recommended that the impact of uneven data distribution can be ignored if the unimodal data exceeds 1,000.

A computer readable medium storing program instructions can be used to perform the methods of the present disclosure, wherein the program provides instructions, when executed by a processing device, causing the processing device to perform the method the present disclosure.

A system for auto gating of quality control (QC) based on population analysis is also provided, comprising:

equipment used for population analysis; QC beads; and the computer readable medium, wherein the equipment comprise a component used for collecting the data of the QC beads, a component used for analyzing the collected data and calculating the gate position of QC beads based on the collected data, and a component used for adjusting the acquisition parameters of the equipment.

Through the QC beads group analysis, the system of the present disclosure can perform a multi-dimensional data analysis on the QC beads, so as to exclude impurities and abnormal data, to retain valid QC beads data, to perform data range analysis, and to obtain the accurate QC beads plot position. Therefore, such QC beads group analysis method can effectively filter out impurities, eliminate noise, avoid the influence of residual particles, and improve the pass rate of QC experiments.

Compared with the methods in the prior art, the technical solution of the present disclosure is beneficial at least in the following aspects. Firstly, in the instant method, QC can pass even when the proportion of impurities in the sample is high. As shown in FIG. 3, in the prior art method, the purity of >50% is necessary, while the present method requires only the purity of >5% for single-peak beads, or the purity of >40% for 8-peak beads. Secondly, QC can pass even if the noise interference in the acquisition process is great. For example, it only requires a noise rate of <95% for single-peak beads, or a noise rate of <60% for 8-peak beads. To the contrary, the prior art method more strictly requires the noise rate of <50%. Thirdly, QC can pass even when the equipment is not sufficiently cleaned before QC test in the present technical solution. For example, when the present solution is used on single type samples, if the residual sample in lines has a signal value higher than the max peak value of the tested QC beads, the test can be performed as long as the amount of the residual sample is <5%. In case that the residual sample has a signal value lower than the max peak value of the tested QC beads, the test can pass even if the amount of the residual sample exceeds 5%. To the contrary, the prior art method requires more strict conditions since any residual in the line can lead to increased probability of failure of the test. Therefore, the new method can improve the pass rate of QC test greatly. In the worst case that beads and impurities cannot be distinguished, the new algorithm can still produce consistent results compared with the original algorithm data. On the other hand, as long as a fluorescence channel can be used to distinguish the data, the new method of the present disclosure will be better than the old one, and the calculated plot position is much more accurate than that obtained by the original algorithm.

It should be understood that the technical solutions according to the present application should not be limited to the examples described above and shown in the accompanying drawings, but may varied as required. For example, the various steps of the methods are not necessarily performed in the order described, but can be adjusted as needed without contradiction. For example, the method shown may have additional steps added as desired, or a step omitted.

The above system or method may be implemented by a control device. The control device in the present application may include a processor implemented as a computer or a computing system. The method of operating and cleaning the sample processing instrument and the method of monitoring the cleaning of the sample processing instrument described herein may be implemented by one or more computer programs executed by the processor of the computer. A computer program includes processor-executable instructions stored on a non-transitory tangible computer readable medium. The computer program may further include stored data. Non-limiting examples of non-transitory tangible computer-readable media are non-volatile memory, magnetic storage devices, and optical storage devices.

The term computer-readable medium does not include transient electrical or electromagnetic signals propagating through a medium such as on a carrier wave; the term computer readable medium can thus be considered tangible and non-transitory. Non-limiting examples of non-transitory tangible computer-readable medium are non-volatile memory (such as flash memory, erasable programmable read-only memory or mask read-only memory), volatile memory (such as static random access memory circuit or dynamic random access memory), magnetic storage medium (such as analog or digital magnetic tapes or hard drives), and optical storage medium (such as CD, DVD, or Blu-ray Disc).

Although the present application has been described with reference to exemplary embodiments, it should be understood that the present application is not limited to the specific embodiments described and illustrated herein. Without departing from the scope defined by the claims, those skilled in the art can make various changes to the exemplary embodiments. Provided that there is no contradiction, the features in the various embodiments can be combined with each other. Alternatively, a certain feature in the embodiment may also be omitted.

The invention claimed is:

1. A method of auto gating of quality control (QC) based on population analysis, the method comprising the following steps:

I) providing QC beads used for testing the performance index of equipment of interest;

II) setting the equipment to collect the data of the QC beads;

III) analyzing the collected data and calculating a gate position of the QC beads based on the collected data, wherein analyzing the collected data includes:

1) Initializing a QC bead filtering result to include all detected events;

2) Performing highest peak analysis on fluorescence channel data to identify a highest fluorescence peak and updating the QC bead filtering result based on an identified highest peak;

3) Determining the gate position of the QC beads by identifying a peak in at least one of forward scatter (FSC) data or side scatter (SSC) data using events included in the updated QC bead filtering result; and IV) adjusting the acquisition parameters of the equipment based on the calculated gate position.

2. The method of claim 1, wherein the QC beads are the same size.

3. The method of claim 1, wherein the size of the QC beads is in the range of 40 nm to 10 μm.

4. The method of claim 1, wherein the size of the QC beads is 500 nm, 3 μm, 6 μm or 10 μm.

5. The method of claim 1, wherein the QC beads are beads conjugated with a fluorescence agent.

6. The method of claim 5, wherein the fluorescence agent is configured to generate fluorescence data in one or more fluorescence channels.

7. The method of claim 1, wherein step II) further includes collecting the forward scatter (FSC) data of the QC beads, and wherein the FSC data is determined by the size of the QC beads.

8. The method of claim 1, wherein step II) further includes collecting the side scatter (SSC) data of the QC beads, and wherein the SSC data is determined by the surface smoothness of the QC beads.

9. The method of claim 1, wherein the step II) further includes collecting fluorescence intensity data of the QC beads in each channel.

10. The method of claim 9, wherein the fluorescence intensity of the QC beads in each channel is in a concentrated range, and the Log axis coordinate system is adopted, so that the fluorescence channel data is distributed in the Log axis coordinate system in a concentrated area.

11. The method of claim 9, wherein the QC beads include eight-peak beads which are distributed in one peak for the FSC and SSC, and distributed in eight peaks in fluorescence channels, and the beads of the eighth peak are distributed on the eighth peak or on the peak with the greatest fluorescence value in all fluorescence channels.

12. The method of claim 1, wherein step 2) further includes:

a) obtaining fluorescence channel data range;

b) creating fluorescence channel coordinate transformation based on the fluorescence channel data range;

c) performing coordinate transformation on the fluorescence channel data to obtain model data;

d) creating fluorescence histogram plot based on the obtained statistics model data;

e) performing multi-peak data analysis on the fluorescence histogram to obtain the highest peak data range analysis;

f) filtering the model data based on the highest peak data range to obtain the highest peak of the fluorescence channel including the QC beads filtering result; and g) performing logical operation on the overall QC beads filter result and the filter result of the fluorescence channel, and setting it to the overall QC beads filter result.

13. The method of claim 12, wherein the multi-peak data analysis of e), further comprises searching peak information from high to low, wherein if the total number of beads in the searched peak accounts for <5%, the data segment is discarded as an interference signal, and the searching for peak information is continued in the low value space.

14. The method of claim 12, wherein after multiple filtering and merging operations of the fluorescence channels, the overall QC beads filter results represent the QC beads population with the highest peak of all calculated fluorescence channels.

15. The method of claim 1, wherein step 2) further includes:

a) obtaining FSC or SSC channel data range;

b) creating channel coordinate transformation based on the channel data range;

c) performing coordinate transformation on the channel data to obtain model data;

d) creating histogram plot based on the filtering result of the highest fluorescence peak and the statistics model data of FSC or SSC;

e) analyzing the peaks based on the histogram plot and obtaining the max peak data range;

f) obtaining the FSC or SSC edge of the max peak and converting it to world coordinate value, as auto gate position; and g) using the max peak range to perform filtering calculations on all FSC or SSC data to obtain the FSC or SSC plot filtering results.

16. The method of claim 1, wherein step 3) further includes:

a) obtaining fluorescence channel data range;

b) creating channel coordinate transformation based on the channel data range;

c) performing channel coordinate transformation on the channel data to obtain model data;

d) creating fluorescence histogram plot based on the statistical model data of the FSC or SSC filtering results;

e) analyzing the peaks based on the histogram plot;

f) obtaining the edge range of each peak; and g) converting the edge range of each peak to world coordinate position, as the multi-peak automatic plot position of the QC fluorescence channel.

17. The method of claim 16, wherein the QC beads comprise beads with the same size and different fluorescence intensity.

18. The method of claim 17, wherein the beads with the same size and different fluorescence intensity are eight-peak beads.

19. The method of claim 16, wherein when the filtering bead range is supplemented after obtaining the FSC position of the QC beads, the data of the filtered beads are used to draw the bead distribution in the fluorescence channel, and multiple peaks are identified by multi-peak identification method.

* * * * *